United States Patent [19]

Gusev et al.

[11] 4,264,300

[45] Apr. 28, 1981

[54] GLASSMAKING TANK FURNACE

[76] Inventors: Stanislav A. Gusev, ulitsa Pulkovskaya, 7, kv. 61; Vladimir M. Mishin, Kharkovsky proezd, 11, korpus 3, kv. 24; Alexandr I. Tjurin, Teply Stan, II Mikroraion, korpus 21, kv. 104; Nikolai P. Pavlov, ulitsa Malaya Kalitnikovskaya, 20, korpus 1, kv. 107; Gennady V. Kalygin, ulitsa Alexeya Dikogo, 16a, kv. 129, all of Moscow, U.S.S.R.

[21] Appl. No.: 33,475

[22] Filed: Apr. 26, 1979

[51] Int. Cl.³ .............................................. F27D 15/02
[52] U.S. Cl. ...................................... 432/83; 65/337; 432/177; 432/238
[58] Field of Search .................. 65/337; 432/238, 210, 432/177, 161, 83

[56] References Cited

U.S. PATENT DOCUMENTS

| 2,567,911 | 9/1951 | Miller | 432/161 |
| 2,834,157 | 5/1958 | Bowes | 432/161 |
| 3,163,408 | 12/1964 | Brichard | 432/210 |
| 3,169,015 | 2/1965 | Henry | 432/238 |
| 3,437,327 | 4/1969 | Day et al. | 432/238 |

FOREIGN PATENT DOCUMENTS 264636 10/1970 U.S.S.R.

Primary Examiner—John J. Camby
Attorney, Agent, or Firm—Lackenbach, Lilling & Siegel

[57] ABSTRACT

A glassmaking tank furnace which comprises a basin, a heating system, a housing which includes a roof and a gas flue, a cooling system, a feed port and a discharging port. The bottom and walls of the basin and at least a part of the housing formed with the feed port are defined by fittingly adjoining metal tubes of the cooling system, which ensure a continuous operation and long service life of the furnace and set up favorable conditions for further intensification of the melting process.

7 Claims, 7 Drawing Figures

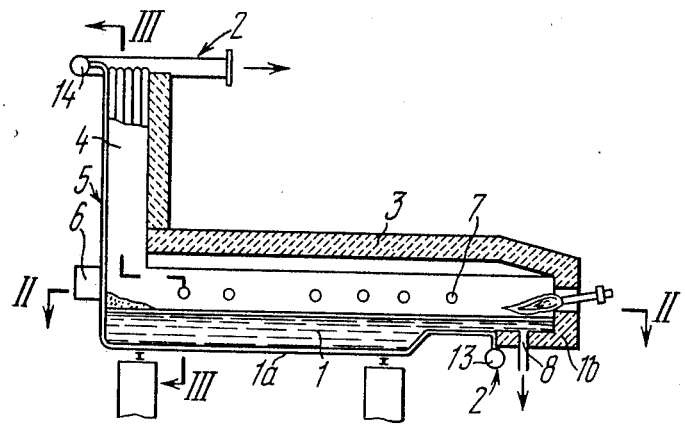
FIG. 1
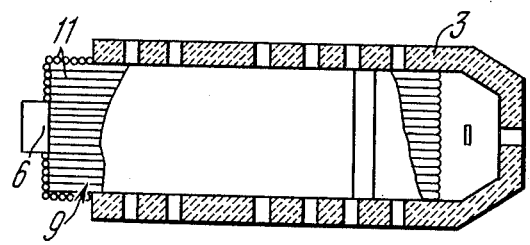
FIG. 2
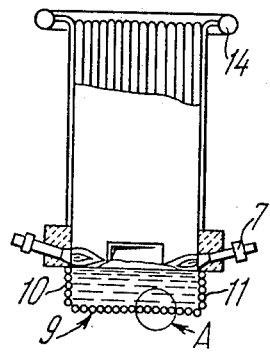
FIG. 3
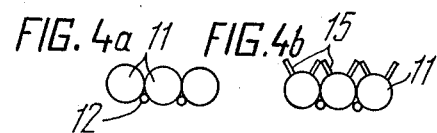
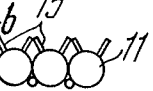
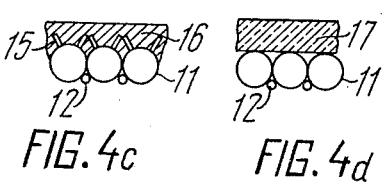
FIG. 4a   FIG. 4b
FIG. 4c   FIG. 4d

GLASSMAKING TANK FURNACE

BACKGROUND OF THE INVENTION

The present invention relates to the production of silicate melts, and more particularly, to a glassmaking tank furnace.

Extensive use has been made of glassmaking tank furnaces, each of which comprises a basin, a heating system, a housing including a roof and a gas flue, as well as a feed port and a discharging port.

For example, French Pat. No. 128,488 discloses a glassmaking tank furnace, the all-metal basin of which is spray-cooled and is lined with a refractory. In some furnaces (cf. U.S.S.R. Inventor's Certificate No. 264,636), a direct-expansion system is used for cooling the basin refractory lining, which system incorporates upright tubes brought in communication with the upper and lower collector mains. The cooling system in question ensures the continuous and reliable operation of basins employed in tank furnaces.

Long service life of tank furnaces, however, is hindered by insufficient strength of the furnace housing at the area of its end wall fitted with a feed port opening. In addition, due to the lack of sufficiently resistant refractories used for the bottom and walls of the furnace basin, it is impossible to further intensify the melting process by subjecting the melt to electrical heating or causing its bubbling, in view of the modern tendency of making the furnace basins smaller in depth. The problem is further complicated by the fact that as refractories are destroyed by agressive melts they contaminate the end product, thereby impairing its quality.

Moreover, in the course of producing high-temperature melts in the tank furnace, there arises a problem of making effective use of the heat liberated from the off gases, which is mainly due to the difficulty of installing heat-employing equipment immediately behind the furnace, since, more often than not, the procedure of using the heat from the off gases invariably required preliminary cooling of the combustion products to adequate temperatures.

SUMMARY OF THE INVENTION

What is therefore required is a glassmaking tank furnace of the type having its basin and at least a part of the housing formed with a feed port constructed so as to ensure long service life of the furnace, enhanced melting process and improved quality of the end product.

The invention provides a glassmaking tank furnace comprising a basin, a heating system, a housing including a roof and a gas flue, a cooling system, a feed port and a discharging port, wherein, according to the invention, the bottom and walls of the basin and at least a part of the housing formed with the feed port are defined by adjoining metal tubes of the cooling system.

Such furnace construction prolongs the service life of the furnace, permits the process of melting to be intensified, and any suitable equipment for utilizing the heat liberated from the off gases can be installed without precooling the products of combustion.

In accordance with the invention, the metal tubes of the cooling system, defining the bottom and walls of the basin and at least a part of the housing, are in communication with each other, and whereby the tank furnace is relatively simple in construction and a part of it may be manufactured industrially.

To improve the removal of heat from the surface of the metal tubes defining the furnace basin, the metal tubes are preferably formed with ribs provided on the surfaces thereof facing the interior of the basin. The surfaces of the metal tubes facing the basin interior are preferably coated with a layer of aluminum.

It is preferred to provide plates, formed of the material produced in the furnace and defining the inner surface of the furnace basin, which should be secured on the cooling system metal tubes forming the furnace basin.

The invention will be further described, by way of example only, with reference to the accompanying drawings.

BRIEF DESCRIPTION OF THE DRAWINGS

FIG. 1 is a longitudinal sectional view of a glassmaking tank furnace;

FIG. 2 is a cross-sectional view along the line II—II of FIG. 1;

FIG. 3 is a cross-sectional view along the line III—III of FIG. 1; and

FIGS. 4 (a–d) are enlarged views of a unit A of FIG. 3, and where:
 (a) illustrates tubes of the cooling system;
 (b) illustrates tubes of the cooling system, formed with ribs;
 (c) illustrates tubes of the cooling system, covered with a layer of aluminum; and
 (d) illustrates tubes of the cooling system, having plates secured thereto.

DETAILED DESCRIPTION OF THE PREFERRED EMBODIMENT

The glassmaking tank furnace, comprises a basin 1, a cooling system 2, for example, a direct-expansion system, a housing including a roof 3 and a gas flue 4. Fitted in the housing end wall 5, defining the gas flue 4, is a feed port 6.

Located or arranged in the melting section 1a above the melt are burners 7 of any conventional design, incorporated in the burners heating system. The bottom of the condition section 1b of the basin 1 is formed with a discharging port 8, through which the melt is fed for further treatment.

The furnace roof 3 and its housing are formed of a refractory material.

A bottom 9 (FIGS. 2 and 3) and walls 10 of the basin 1, as well as at least a part of the housing or the end wall 5, formed with the feed port 6, are defined by metal tubes 11 of the cooling system, which tubes are in fitting relationship with one another. To ensure rigid construction of the basin, there are provided rods 12 (FIG. 4a) which are interposed between the tubes 11 and are welded thereto from the inside. The metal tubes 11, defining the bottom and walls of the basin 1, are arranged horizontally and have their ends extending into a collector main 13, whereas the metal tubes 11 defining the end wall 5 are arranged vertically and have their ends extending into a collector main 14.

To render the furnace basin simple in construction, the horizontal and vertical metal tubes 11 are either in communication with one another or else made as an integral whole.

To improve the heat removal process, the metal tubes 11 of the cooling system are formed with ribs 15 (FIG. 4b) provided on the surfaces thereof facing the interior of the basin 1 and, which, if desired, can be coated with a layer of heat-conducting ceramic material.

The metal tubes 11 of the cooling system may have their surfaces facing the interior of the basin 1 coated with a layer 16 (FIG. 4c) of aluminum.

In addition, plates 17 (FIG. 4d) made of the material produced in the furnace can be secured on the surfaces of the tubes 11 from the inside of the basin 1, which plates 17 can also be affixed on the layer (16) of aluminum (not shown). The layer 16 and plates 17 form the inner surface of the basin 1.

It will be understood that to ensure automatic performance of the glassmaking tank furnace of the invention, the latter is equipped with all necessary devices of any conventional design.

The glassmaking tank furnace of the invention operates in the following manner.

A glassmaking material is fed to the furnace basin 1 through the feed port 6 (FIG. 1). With the cooling system switched on, the burners 7 of the heating system are used for heating the feed material and melting same. As this happens, a durable layer of lining is formed on the walls of the metal tubes 11, incorporated in the system of cooling, the bottom 9 and walls of the basin 1. The thickness of the lining layer depends on the temperature of the melt, its thermal conductivity, on the presence of heat-and-mass exchange and, to a certain extent, on the rate of cooling. Combustion gases are removed through the gas flue 4. The melt is discharged continuously through the discharging port 8. The layer 16 of aluminum, plates 17 and the layer of hardened lining prevent the metal tubes 11 from overheating.

From the above, it follows that the improvements offered will ensure a reliable and continuous operation of the tank furnace. It is likewise possible to further intensify the melting process which otherwise is hindered by the refractory lining of the furnace housing. In addition, electrical heating and air-lifting of the melt can be successfully used for the intensification of the melting process. The proposed furnace construction allows for a small depth of the basin 1 which, in turn, permits glass to be made in a thin layer. The furnace construction also makes it possible to produce practically all kinds of corrosion-aggressive melts, which can be provided in sufficiently large amounts, so that it is not always suitable to furnish each of them with a corresponding refractory, sometimes expensive and scarce, as is the case with chromoxide. Therefore, even though the refractories required for the process may turn out to be unavailable, it is still possible to produce a desired melt with the furnace construction of the invention.

Long service life of the tank furnace of the present invention is ensured by the provision of the water-cooled end wall 5 disposed in the area where combustion gases are discharged from the furnace. In the event of furnaces provided with direct heating, the water-cooled end wall 5 permits the temperature of the off gases to be brought down to such temperatures that will permit safe operation of a heat-utilizing apparatus manufactured from various steels and alloys now in use.

There is no need for the off gases to be either water- or air-sprayed, which is not economical from the point of view of utilization of the heat liberated from the off gases or excessive consumption of electric energy, or else in view of the large expences required for the construction of a smoke stack for the removal of combustion gases. Where corrosion-aggressive melts destroy refractory linings of the furnace basin and thereby contaminate the end product, the furnace construction of the invention improves the quality of the end product and increase its yield.

Although the present invention has been described in some detail by way of illustration and example for purposes of clarity of understanding, it will, of course, be understood that various changes and modifications may be made in the form, details, and arrangements of the parts without departing from the scope of the invention as set forth in the following claims.

What is claimed is:

1. A glassmaking tank furnace for the melting of high-melting materials, comprising: a generally shallow furnace basin; a heating system; a refractory housing including a roof and a gas flue, an evaporative cooling system; a feed port provided in the said housing; a discharging port provided in the basin's bottom; adjacently disposed horizontal and vertical metal tubes, incorporated in said cooling system and in communication with each other, defining the bottom and walls of said basin and at least a part of said housing formed with the feed port, and means interposed between said tubes from the outside thereof for forming a rigid construction of said furnace, whereby the melting of materials may be intensified and enhanced and the service life of the furnace is improved.

2. A glassmaking tank furnace as claimed in claim 1, wherein the metal tubes defining the bottom and walls of the basin are arranged horizontally and their ends extend into a lower collector main, and the metal tubes defining at least a part of said housing formed with the feed port are arranged vertically and extend into an upper collector main.

3. A glassmaking tank furnace as claimed in claim 1, wherein the metal tubes are formed with ribs provided on the surfaces of said metal tubes facing the interior of the basin.

4. A glassmaking tank furnace as claimed in claim 1, wherein the metal tubes are secured to a plurality of plates formed of a material produced in the furnace.

5. A glassmaking tank furnace as claimed in claim 1, including a layer of aluminum on the surfaces of the metal tubes facing the interior of the basin forming a monolithic structure with said metal tubes and equalizing the heat load of said metal tubes.

6. A glassmaking tank furnace as claimed in claim 5, including a plurality of plates of a material produced in the furnace secured to said layer of aluminum.

7. A glassmaking tank furnace as claimed in claim 1, wherein said means interposed between said tubes are rods welded to the metal tubes.

* * * * *